2,934,420
Patented Apr. 26, 1960

2,934,420

PESTICIDAL AND HERBICIDAL COMPOSITIONS OF MATTER

Richard S. Cook, Rockledge, and W E Craig, Philadelphia, Pa., assignors to Rohm & Haas Company, Philadelphia, Pa., a corporation of Delaware No Drawing. Application October 14, 1955
Serial No. 540,635

12 Claims. (Cl. 71—2.6)

This invention is concerned with the new compound β-selenocyanoethyl cinnamate and its use for the control of pests and plant growth.

The new compound has the formula $$\phi CH=CHCOOCH_2CH_2SeCN$$

where $\phi$ is the phenyl group. It is quite unusual in that it is a general pesticide, being a fungicide, miticide, and insecticide, serving both as a contact poison and as a stomach poison in the latter capacity. The compound also has herbicidal and plant-growth control properties.

In order to utilize the pest control properties of the β-selenocyanoethyl cinnamate of the invention to best advantages, the cinnamate is formulated by admixture with suitable pest control adjuvants to provide compositions in the form of solutions, dusts, water-dispersible powders, and aqueous dispersions or emulsions.

By the term "pest control adjuvant," is meant a substance which is capable of presenting or aiding in the presentation of an active compound to the pest.

The active compound of the invention, β-selenocyanoethyl cinnamate, is applied either as a spray or a dust to the locus or area to be protected from insects, fungi, and undesirable plant growth, or any one of these pests. The active compound is, of course, applied in amount sufficient to exert the desired pest control action. The application can be made directly upon the locus or area and the pest thereon during the period of infestation or, alternatively, the application can be made in advance of an anticipated infestation or otherwise applied so that the pest will come into contact with the toxic residue and be killed.

Pest control adjuvants that may be used in preparing the pest control compositions containing the new compound of the present invention include dusts, solvents, wetting, dispersing, and emulsifying agents. Solvents that may be used include hydrocarbons, such as methylated naphthalenes, high flash naphthas, and the various solvents mentioned in U.S. Patent 2,503,915 (col. 2, line 49, to col. 6, line 6). There may also be used the various emulsifying agents and mixtures thereof, disclosed in the aforesaid patent (col. 3, lines 6 to 59). The composition may also contain corrosion inhibitors, including alkali metal (Na, K, Li, etc.) and alkaline earth metal (Ca, Mg, etc.) salts of higher alkyl-benzenesulfonates containing one or more alkyl groups having 8 to 18 carbon atoms, such as calcium t-octylbenzenesulfonate, calcium dodecylbenzenesulfonate, calcium octadecylbenzenesulfonates, or any of the sulfonates disclosed in the aforesaid patent. Such corrosion inhibitors also aid the emulsification.

Preferably the pest control composition of the invention is in the form of a "concentrate" suitable for dispersion in water to give an aqueous spray composition. A suitable emulsifiable oil concentrate is obtained, for example, by adding a dispersing or emulsifying agent to the β-selenocyanoethyl cinnamate of the invention, a solvent also being employed if desired. Preferably, the dispersing or emulsifying agent is one which is soluble in the compound, or the solvent, and ordinarily the agent will not comprise more than 10% by weight of the emulsifiable oil composition and with the better adjuvant materials, the precentage will be 5% or less.

Less concentrated emulsifiable oil concentrates are prepared by dissolving the β-selenocyanoethyl cinnamate of the invention and a wetting, dispering, or emulsifying agent in a solvent of the type conventionally used in the preparation of pest control compositions or one of the solvents mentioned in the aforesaid patent.

Dust compositions of the invention contain the β-selenocyanoethyl cinnamate of the invention adsorbed on finely divided carriers on dusts such as talc, pyrophyllite, natural clays, diatomaceous earths, and other powdered diluents.

The dust compositions of the invention are prepared by mixing intimately the β-selenocyanoethyl cinnamate with the powdered carrier. Alternatively, the toxic compound can be dissolved in a volatile solvent such as acetone and the solution thus obtained then mixed with the powered carrier and the solvent subsequently removed from the composition by evaporation.

Water-dispersible powders of the invention can be prepared by admixing the compound of the invention with a surface-active dispersing agent and a finely divided solid carrier or dust such as those mentioned heretofore, the surface-active agent being used in amount sufficient to impart water dispersibility to the powder.

The compositions of the invention may include fungicides such as zinc dimethyl dithiocarbamate, zinc ethylene bis-dithiocarbamate, and manganese ethylene bis-dithiocarbamate; insecticides such as DDT, methoxychlor, chlordane; other fungicides and insecticides such as those mentioned in U.S. Patent 2,503,915 mentioned hereinabove; and may include fertilizers or plant hormones or growth stimulants to form either powdery or granular compositions that can be used in the cultivation of agricultural crops.

The content of the active compound of the invention in the pest control compositions of the invention will vary according to the manner in which and the purpose for which the composition is to be applied but, in general, will be from 0.01% to 95% by weight of the composition.

The concentration of the β-selenocyanoethyl cinnamate in the composition when applied for the killing of insects such as the Mexican bean beetle, the armyworm, and the black bean aphid can be adjusted to provide an effective kill of the insects without harming the plant. When killing of weeds or any other undesired plant growth is intended as well as the killing of insects, mites, fungi, and the like, a higher concentration, even up to 100%, of the β-selenocyanoethyl cinnamate in the composition applied is generally used. The exact limit of concentration below which no injury to a plant occurs and above which injury starts depends on the particular plant and the particular composition, i.e. the nature of the adjuvant or adjuvants, the presence or absence of "safening" agents and so on. Generally, for controlling pests, the concentration of the active ingredient, when in emulsion or solution form, will be from 0.01% to 5%, and preferably less than 1% in pesticidal applications, whereas in herbicidal or in combined herbicidal and pesticidal applications, the concentrations in solutions or emulsions may be from 2% to 20%, and preferably 6% to 10%. Among the uses of the β-selenocyancyanoethyl cinnamate is application by dusting or spraying for defoliating cotton plants to aid in the picking thereof.

The following examples lilustrate the preparation of the new compound, pesticidal compositions, and their effectiveness:

Example 1

(a) A mixture of 1165 parts of β-chloroethyl cinnamate, 1193 parts of potassium selenocyanate, 3000 parts of methyl isobutyl ketone and about ¼ part of copper powder was stirred at reflux (125° C.) for 24 hours. The mixture was cooled and filtered to remove inorganic salts (405 parts). After washing with five portions each of 1000 parts (last portion did not produce a red color with ferric ion), the mixture was concentrated under reduced pressure to give 1530 parts of β-selenocyanoethyl cinnamate as a red oil.

(b) The corresponding β-thiocyanoethyl cinnamate was made in a similar manner using sodium thiocyanate in place of potassium selenocyanate.

(c) The fungitoxicity of the products of parts (a) and (b) hereof against Stemphylium sarcinaeforme was determined. In each case, the lethal dose for 50% kill ($L.D._{50}$) is at a concentration between 5 and 10 p.p.m. Against Monilinia fructicola, the $L.D._{50}$ in each case is less than 5 p.p.m.

*Example 2*

The products of parts (a) and (b) of Example 1 are made up into dust formulations comprising 10% by weight of a respective one of the active cinnamates with 90% of pyrophyllite. When applied to an infestation of black bean aphids, the dust containing the product of part (b) gave no control of the aphids whereas the dust containing β-selenocyanoethyl cinnamate provided a 99% kill of the aphids. As a stomach poison, the 10% dust containing the β-selenocyanoethyl cinnamate gave a 73% kill of the armyworm whereas that containing β-thiocyanoethyl cinnamate caused zero kill. Against the Mexican bean beetle, the former dust was roughly twice as effective as the latter.

*Example 3*

(a) A solution of 25 parts by weight of β-selenocyanoethyl cinnamate and 5 parts of methylene-bis-diamylphenoxypolethoxyethanol in 70 parts of methylated naphthalene is dilutable to various extents with water to form sprayable emulsions.

(b) In the same way sprayable emulsions containing β-thiocyanoethyl cinnamate as the active agent are made.

(c) The solution of part (a) hereof is diluted with water to such an extent that there is 1 part by weight of β-selenocyanoethyl cinnamate per 3200 parts by weight of emulsion. The resulting emulsion produces an 86% kill of red spiders. At a concentration of 1:800, 100% kill of red spiders is obtained. When the solution of β-thiocyanoethyl cinnamate of part (b) is applied at 1:800 concentration, a 71% kill of red spiders is obtained.

(d) The solution of part (a) hereof is diluted with water to a concentration of 1:400. The emulsion obtained produced a 67% kill of rice weevil.

(e) The solution of part (a) hereof is diluted with water to a concentration of 1:800. The emulsion obtained effected a 99% kill of the black bean aphid.

(f) The solution of part (a) hereof is diluted with water to a concentration of 1:18. Application to poison ivy effectively eradicates this plant.

It is to be understood that changes and variations may be made without departing from the spirit and scope of the invention as defined in the appended claims.

We claim:

1. A composition adapted to control fungi, mites, insects and undesirable plant growth comprising β-selenocyanoethyl cinnamate in admixture with an adjuvant, the cinnamate being present in an amount at least sufficient to exert a controlling effect.

2. A composition adapted to control fungi, mites, insects and undesirable plant growth comprising β-selenocyanoethyl cinnamate in admixture with a solvent, the cinnamate being present in an amount at least sufficient to exert a controlling effect.

3. A composition adapted to control fungi, mites, insects and undesirable plant growth comprising β-selenocyanoethyl cinnamate in admixture with an emulsifier in an amount sufficient to impart water-dispersibility to the composition, the cinnamate being present in an amount at least sufficient to exert a controlling effect.

4. A composition adapted to control fungi, mites, insects and undesirable plant growth comprising β-selenocyanoethyl cinnamate in admixture with a solvent and an emulsifier, the cinnamate being present in an amount at least sufficient to exert a controlling effect.

5. A method for the control of undesirable plant growth, fungi, mites, and insects which comprises applying β-selenocyanoethyl cinnamate to a locus to be protected in at least sufficient amount to exert a controlling effect.

6. A method for the control of undesirable plant growth, fungi, mites, and insects which comprises applying a dust comprising β-selenocyanoethyl cinnamate to a locus to be protected in at least sufficient amount to exert a controlling effect.

7. A method for the control of undesirable plant growth, fungi, mites, and insects which comprises applying a dispersion in a liquid comprising β-selenocyanoethyl cinnamate to a locus to be protected in at least sufficient amount to exert a controlling effect.

8. An aqueous composition adapted to control fungi, mites, insects and undesirable plant growth comprising β-selenocyanoethyl cinnamate dispersed in the aqueous phase by an emulsifying agent, the cinnamate being present in an amount at least sufficient to exert a controlling effect.

9. An aqueous composition adapted to control fungi, mites, insects and undesirable plant growth comprising an aqueous phase and a solution of β-selenocyanoethyl cinnamate in an organic solvent dispersed in the aqueous phase by an emulsifying agent, the cinnamate being present in an amount at least sufficient to exert a controlling effect.

10. An aqueous composition adapted to control fungi, mites, insects and undesirable plant growth comprising an aqueous phase and a solution of β-selenocyanoethyl cinnamate in a hydrocarbon solvent dispersed in the aqueous phase by an emulsifying agent, the cinnamate being present in an amount at least sufficient to exert a controlling effect.

11. A composition adapted to control fungi, mites, insects and undesirable plant growth comprising β-selenocyanoethyl cinnamate in admixture with a dust, the cinnamate being present in an amount at least sufficient to exert a controlling effect.

12. β-Selenocyanoethyl cinnamate.

References Cited in the file of this patent

UNITED STATES PATENTS

| | | |
|---|---|---|
| 2,209,184 | Borglin | July 23, 1940 |
| 2,217,615 | Borglin | Oct. 8, 1940 |
| 2,423,291 | Borglin | July 1, 1947 |
| 2,667,411 | Mowry et al. | Jan. 26, 1954 |
| 2,749,229 | Ligett et al. | June 5, 1956 |
| 2,749,231 | Ligett et al. | June 5, 1956 |
| 2,749,232 | Ligett et al. | June 5, 1956 |

OTHER REFERENCES

Frear: Catalogue of Insecticides and Fungicides, vol. 1, 1947, page 93.

King: U.S. Dept. of Agric. Bulletin No. 69, May 1954, pages 117, 118.